US009146756B2

(12) United States Patent
McArdle

(10) Patent No.: US 9,146,756 B2
(45) Date of Patent: Sep. 29, 2015

(54) JAVA MANAGEMENT EXTENSIONS (JMX) BEAN CUSTOM SERVICE EXTENSION PLUGIN AGENT FOR AN APPLICATION SERVER

(75) Inventor: James Michael McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2770 days.

(21) Appl. No.: 11/563,331

(22) Filed: Nov. 27, 2006

(65) Prior Publication Data

US 2008/0127076 A1   May 29, 2008

(51) Int. Cl.
G06F 9/44      (2006.01)
G06F 9/445     (2006.01)

(52) U.S. Cl.
CPC ........ G06F 9/44526 (2013.01); G06F 9/44536 (2013.01)

(58) Field of Classification Search
CPC .......................... G06F 9/44526; G06F 9/44536
USPC ......................................................... 717/120
See application file for complete search history.

(56) References Cited

U.S. PATENT DOCUMENTS 7,546,605 B1 *  6/2009  Kruger et al. ................. 719/316
7,577,731 B2 *  8/2009  Frey et al. ..................... 709/223
2003/0061247 A1 *  3/2003  Renaud ......................... 707/205
2004/0003122 A1 *  1/2004  Melillo ......................... 709/246
2004/0168153 A1 *  8/2004  Marvin ......................... 717/120
2004/0230674 A1 * 11/2004  Pourheidari et al. ......... 709/223
2004/0255264 A1 * 12/2004  Simpson ....................... 717/100
2005/0261875 A1 * 11/2005  Shrivastava et al. .......... 702/183
2005/0273490 A1 * 12/2005  Shrivastava et al. .......... 709/203
2005/0273667 A1 * 12/2005  Shrivastava et al. ............ 714/38
2006/0026552 A1 *  2/2006  Mazzitelli et al. ............ 717/101
2006/0036715 A1 *  2/2006  Ghattu ......................... 709/220
2006/0248503 A1 * 11/2006  Sabev .......................... 717/101
2007/0011618 A1 *  1/2007  Maron .......................... 715/749
2008/0127076 A1 *  5/2008  McArdle ....................... 717/120

* cited by examiner

Primary Examiner — Marina Lee
(74) Attorney, Agent, or Firm — Jeffrey L. Streets

(57) ABSTRACT

A JMX plugin agent that interfaces between an MBean server and a JMX plugin directory. The JMX plugin agent simplifies development and modification of MBeans by automating registration and unregistration of MBeans with the MBean server and enabling organization of multiple versions of an MBean within a common JMX plugin directory. A generic JMX plugin agent scans a JMX bean plugin directory looking for MBeans to create and register with the MBeanServer. Preferably, each MBean has its own subdirectory that indicates the MBean version and includes a plugin.xml file that describes any necessary configuration parameters. The JMX plugin agent makes it easier to deploy JMX beans to multiple WAS instances and even provides for plugin dependency and version control.

14 Claims, 3 Drawing Sheets

JAVA MANAGEMENT EXTENSIONS (JMX) BEAN CUSTOM SERVICE EXTENSION PLUGIN AGENT FOR AN APPLICATION SERVER

BACKGROUND OF THE INVENTION

1. Field of the Invention

The present invention relates to use of JMX beans in an application server environment.

2. Description of the Related Art

JAVA (a trademark of the Oracle Corporation) is an object-oriented language. JAVA programs are constructed using one or more objects which communicate to accomplish some task. Software objects are similar to real world objects in that they have both state and behaviors. The state of an object is stored in variables and their behaviors are implemented with methods. Variables are named records in which you can store data for later use. Methods are named pieces of code that implement behaviors the object is capable of.

JAVA programs may include many software objects of the same basic kind. In object-oriented terminology, each implementation or manifestation of the object is an "instance" of the generic class of the object. Each instance of the object has its own state, but every instance has the same methods defining their behavior. The object instances are constructed from a software blueprint, referred to as a "class definition," which is written by a programmer. Accordingly, a class must declare instance variables to hold the object's state and include instructions for the methods that the object implements to form the behavior. In this manner, a class definition can be used to create objects of that class by instantiating them. When created, each object has memory allocated to it to hold its instance variables (i.e., its state). The state of each object is separate from that of the others. After an object is created, you can call its instance methods to have it do something.

In addition to instance variables and instance methods, the class can define static variables and static methods. Static variables are not duplicated in each instance. They store properties that belong to the class as a whole. Each instance of the class will get the same value when accessing a static variable. Collectively, instance variables and static variables are referred to as member variables because they are members of the class.

A JAVA object that represents a resource to be managed, such as an application, device or service, is referred to as a "managed bean" or simply an "MBean." An MBean has a management interface consisting of the named and typed attributes that can be read and written, the named and typed operations that can be invoked, and the typed notifications that can be emitted by the MBean. For example, an MBean representing an application program's configuration could have attributes representing the different configuration parameters, such as a cache size. Reading the CACHESIZE attribute of the MBean would return the current size of the cache. Writing CACHESIZE would update the size of the cache, potentially changing the behavior of the running application. An operation such as "save" could store the current configuration persistently. The MBean could send out a notification such as CONFIGURATIONCHANGEDNOTIFICATION when the configuration changes.

MBeans can be standard or dynamic. Standard MBeans are JAVA objects that conform to design patterns derived from the JavaBeans component model. A standard MBean exposes the resource to be managed directly through its attributes and operations. Attributes are exposed through "getter" and "setter" methods. Operations are the other methods of the class that are available to managers. All these methods are defined statically in the MBean interface and are visible to a JMX agent through introspection. This is the most straightforward way of making a new resource manageable. A dynamic MBean is an MBean that defines its management interface at runtime. For example, a configuration MBean could determine the names and types of the attributes it exposes by parsing an XML file.

An MBean must be registered in a core managed object server, referred to as an "MBean server," before the MBean can be used. An MBean server acts as a management agent, runs on most devices enabled for the JAVA programming language, and is a repository of MBeans. Each MBean is registered with a unique name within the MBean server. Other objects or application programs do not access an MBean directly, but rather access the MBean by name through the MBean Server.

There are generally two ways to create an MBean. One is to construct a Java object that will be the MBean, then use the REGISTERMBEAN method to register it in the MBean Server. The other is to create and register the MBean in a single operation using one of the CREATEMBEAN methods. An MBean can even perform actions when it is unregistered from an MBean Server if it implements the MBEANREGISTRATION interface.

JAVA Management Extensions (JMX) technology provides a JMX specification that defines an architecture, the design patterns, the APIs, and the services for application and network management and monitoring in the JAVA programming language. The JMX specification defines a JMX agent that manages resources instrumented in compliance with the specifications. A JMX agent includes an MBean server, MBeans that have been registered with the MBean server, and a set of services for handling MBeans. In this way, JMX agents directly control resources and make them available to remote management applications. JMX technology also defines standard connectors, known as "JMX connectors," that provide access to JMX agents from remote management applications. JMX connectors using different protocols provide the same management interface. Hence a management application can manage resources transparently, regardless of the communication protocol used. JMX agents can also be used by systems or applications that are not compliant with the JMX specification but which support JMX agents.

FIG. 1 is a schematic diagram of an application server 10 having a JMX Agent 12 for managing resources 17, 19, 21. The JMX Agent 12 includes an MBean server 14, a plurality of MBeans 16, 18, 20 that are identified in a registry 22, and services 24 for handling the MBeans. The JMX Agent 12 also includes JMX connectors and protocol adapters 26 that enables access to the JMX Agent 12 via remote management application 28 and web browser 29.

While the use of MBeans provides numerous programming benefits, the programmer is still faced with the challenge of keeping the MBeans organized. This organizational challenge is greatest when modifying an existing MBean, since the original MBean must be unregistered and removed from the MBean Server and a modified MBean must be copied to the MBean Server and registered. It may also be necessary to save the original MBean in case the modified MBean does not work as intended and it becomes necessary to revert to the original MBean. It should also be recognized that numerous MBeans may be modified over time during the development of a program.

Therefore, there is a need for improved methods and systems for managing MBeans. It would be desirable if the methods and systems simplified the development and modification of MBeans. Most desirably, the methods and systems would simplify registration and unregistration of MBeans and provide improved organization for maintaining registered and unregistered MBeans.

SUMMARY OF THE INVENTION

The present invention provides a method and a machine-accessible medium containing instructions, which when executed by a machine cause the machine to perform operations in accordance with the method. The method comprises identifying a JAVA MBean in a JMX plugin directory having a plurality of versions of the MBean, and registering the latest version of the MBean with an MBean server. The method may further comprise creating an instance of the registered version of the MBean. Optionally, the method may include continuously scanning the JMX plugin directory for new versions of the MBean. The method also preferably includes identifying MBeans that the MBean depends upon, and determining whether the dependent MBeans are present in the JMX plugin directory.

In one embodiment, the method identifies a new version of the MBean, unregisters the current version of the MBean from a plugin registry, and registers the new version of the MBean with the plugin registry. Optionally, the MBean version is incorporated into the name of a subdirectory containing a plugin.xml file for the MBean version.

In another embodiment, the method may further comprise instantiating the MBean for each of a plurality of instances of an MBean server, wherein each instantiated MBean is created from the same JMX plugin directory. Preferably, the plurality of MBean server instances are each associated with an instance of an application server program on a common web server.

DETAILED DESCRIPTION

The present invention provides improved methods and systems for managing MBeans. The functions and components of the invention are preferably embodied in a JMX plugin agent that interfaces between an MBean server and a JMX plugin directory. The JMX plugin agent simplifies the development and modification of MBeans by automating registration and unregistration of MBeans with the MBean server and enabling organization of multiple versions of an MBean within a common JMX plugin directory.

A generic JMX plugin agent scans a JMX bean plugin directory looking for MBeans to create and register with the MBeanServer. Each MBean preferably has its own subdirectory that indicates the MBean version and includes a plug-in.xml file that describes any necessary configuration parameters. The JMX plugin agent makes it easier to deploy JMX beans to multiple WAS instances and preferably even provides for plugin dependency and version control.

In one embodiment, the JMX plugin agent is preconfigured into an application server environment, such as the WEBSPHERE Application Sever (WAS) (Websphere is a trademark of International Business Machines Corporation, Armonk, N.Y.) as a custom service extension. Upon WAS startup, the JMX plugin agent scans an end user configurable JMX plugin directory for MBeans to create and register with the WAS instance. Optionally, the MBean plugin.xml file provides dependency and version control information so that the JMX plugin agent can verify that the necessary support classes are present and that the latest version of a given plugin is going to be used.

Two separate versions of the same named MBean plugin may be present in the same JMX plugin directory and the JMX plugin agent will identify which of the MBeans of the same name have the highest version number. Accordingly, a system administrator can simply pull or disable a newer version of an MBean either by renaming the plugin.xml file or removing the newer version of the MBean from the JMX plugin directory, so that the JMX plugin agent would select the previous version of the MBean.

Autonomic strategies may also be employed wherein a continuously running JMX plugin agent periodically scans the JMX plugin directory looking for new versions of any MBeans. Upon finding a new version of an MBean, the JMX plugin agent will unregister the currently running version of the MBean and registering the new MBean without the need to restart WAS. The JMX plugin agent also allows the same JMX plugin directory to be used by multiple WAS instances so that a new version of an MBean is made available in all associated WAS instances.

Figure 1:
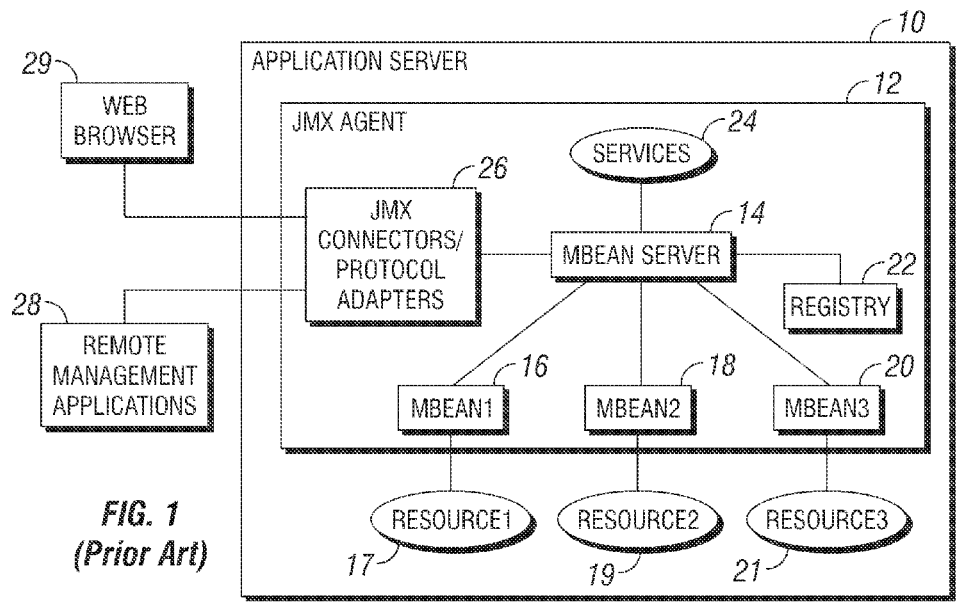
FIG. 1 is a schematic diagram of an application server having a prior art JMX Agent capable of managing one or more resources.
Figure 2:
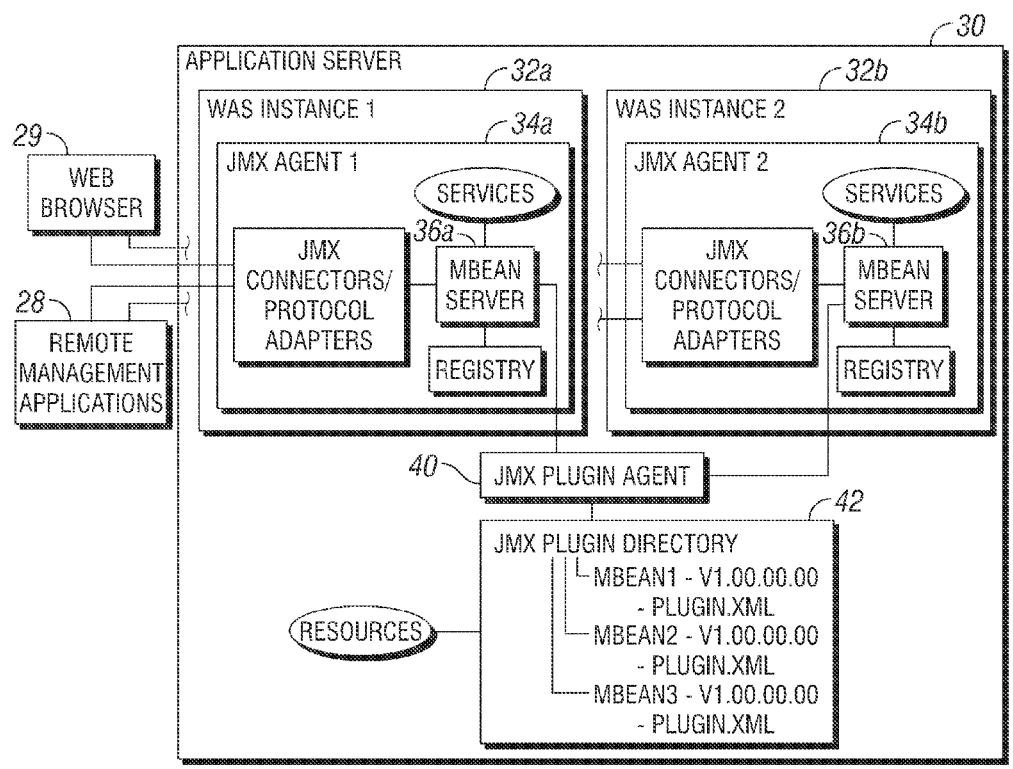
FIG. 2 is a schematic diagram of an application server having two Websphere Application Server (WAS) instance, where each WAS instance has a JMX Agent with an MBean server in communication with a JMX plugin agent in accordance with one embodiment of the present invention.

FIG. 2 is a schematic diagram of an application server 30 having two Websphere Application Server (WAS) instances 32a, 32b, where both WAS instances have a JMX Agent 34a, 34b with an MBean server 36a, 36b in communication with a JMX plugin agent 40 in accordance with one embodiment of the present invention. The JMX plugin agent 40 manages the JMX plugin directory 42 by scanning the MBean subdirectories to identify the highest version of a named MBean. The named MBean having the highest version number is registered in a registry of the respective MBean servers 36a, 36b. If the registry includes a previously registered MBean of the same name but lower version number, then the lower version MBean is unregistered. However, according to the invention it is not necessary to remove the lower version MBean from the JMX plugin directory. Optionally, the JMX plugin agent may also provide dependency checks for the MBeans that it registers.

Figure 3:
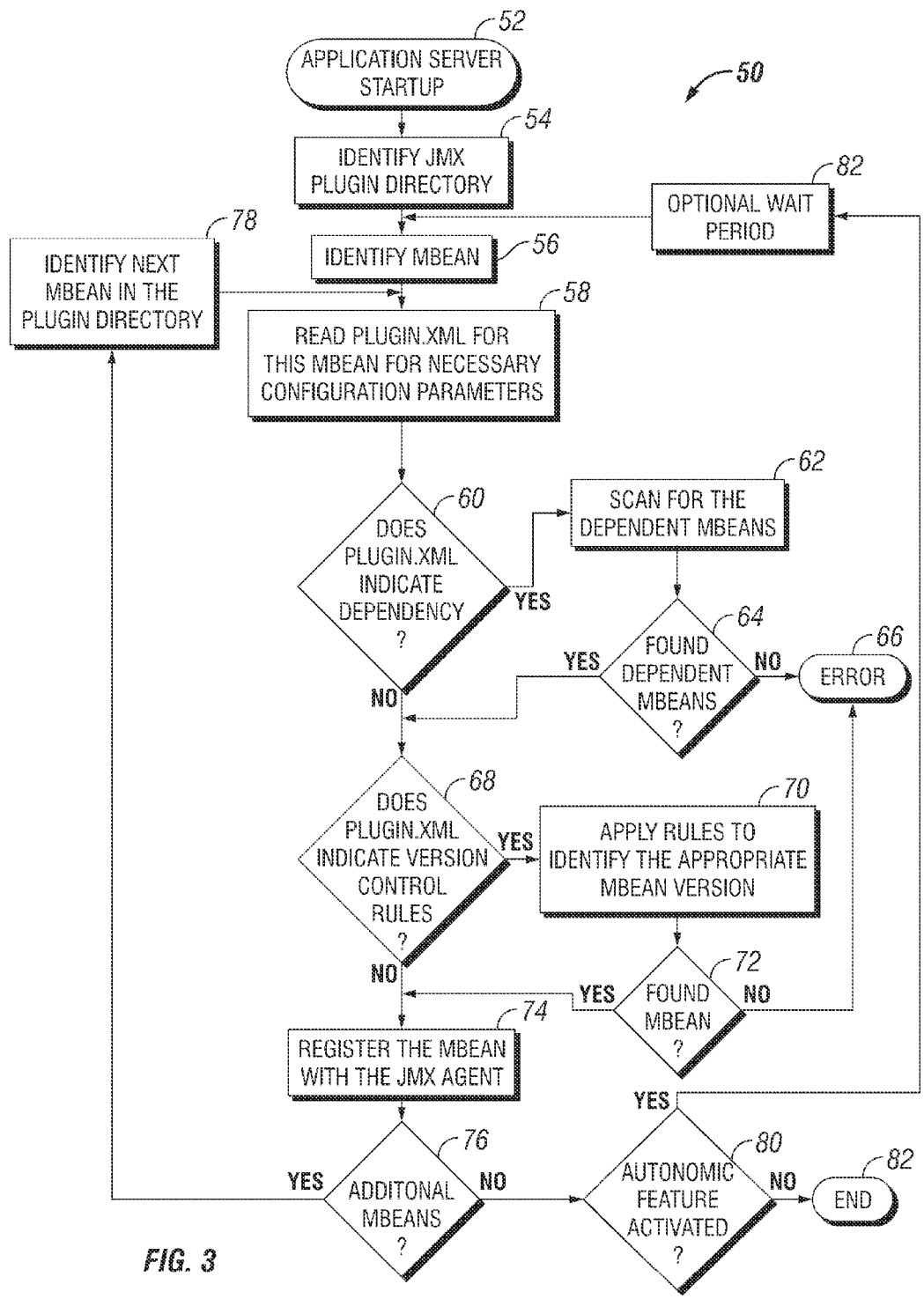
FIG. 3 is a logic diagram of a method performed by one embodiment of a JMX plugin agent in accordance with the present invention.

FIG. 3 is a logic diagram of a method 50 performed by one embodiment of a JMX plugin agent 40 (See FIG. 2) in accordance with the present invention. Following application server startup in the first state 52, the JMX plugin directory is identified in state 54. In state 56, at least one named MBean is identified within the JMX plugin directory. The plugin.xml file for the MBean is then read, in the next state 58, to identify any necessary configuration parameters. In the next state 60, it is determined whether the plugin.xml file indicates dependency upon other MBeans. If the named MBean indicates no dependencies, then the method continues to state 68. However, if the named MBean indicates dependency upon one or more other MBeans, then, in state 62, the plugin directory is scanned to verify the presence of the dependent MBeans. If the dependent MBeans are not found in state 64, then there is an error 66. If the dependent MBeans are found in state 64, then the method continues to state 68.

In state 68, the JMX plugin agent determines if the plugin.xml file indicates that version control rules should be followed. If version control rules are not to be applied, then the method continues to state 74. However, if version control rules are to be applied, then the version control rules are applied, in state 70, in order to identify the appropriate MBean version to utilize. In accordance with the foregoing embodiments of the invention, version control may be generally used. Optionally, the plugin.xml file may simply be allowed to override the version control that the JMX plugin agent will otherwise apply. Further still, the JMX plugin agent might be configured to always apply version control without regard to the configuration parameters of the plugin.xml file. If the identified version of the MBean is not found in the JMX plugin directory, then there is an error 66. If the identified version of the MBean is found in the JMX plugin directory, then the method continues to state 74. As described above, a JMX plugin agent that registers the highest version of a named MBean will find the named MBean, so long as there is at least one version of that named MBean in the JMX plugin directory.

In state 74, the identified version of the named MBean is registered with the MBean server that is part of the JMX agent. Then, in state 76, it is determined whether the JMX plugin directory includes any other MBeans. If state 76 identifies that there are additional MBeans in the JMX plugin directory, then the method continues to state 78 to identify the next MBean in the plugin directory. Steps 58-76 are then repeated for this next MBean. When state 76 determines that there are no more named MBeans in the JMX plugin directory that must be registered, then the method continues to state 80. If state 80 determines that an autonomic feature is active, then following an optional wait period 82, the method returns to state 56 to identify new MBeans or modified versions of a named MBean. Alternatively, if state 80 determines that an autonomic feature is not activated, then the method ends in state 82.

Figure 4:
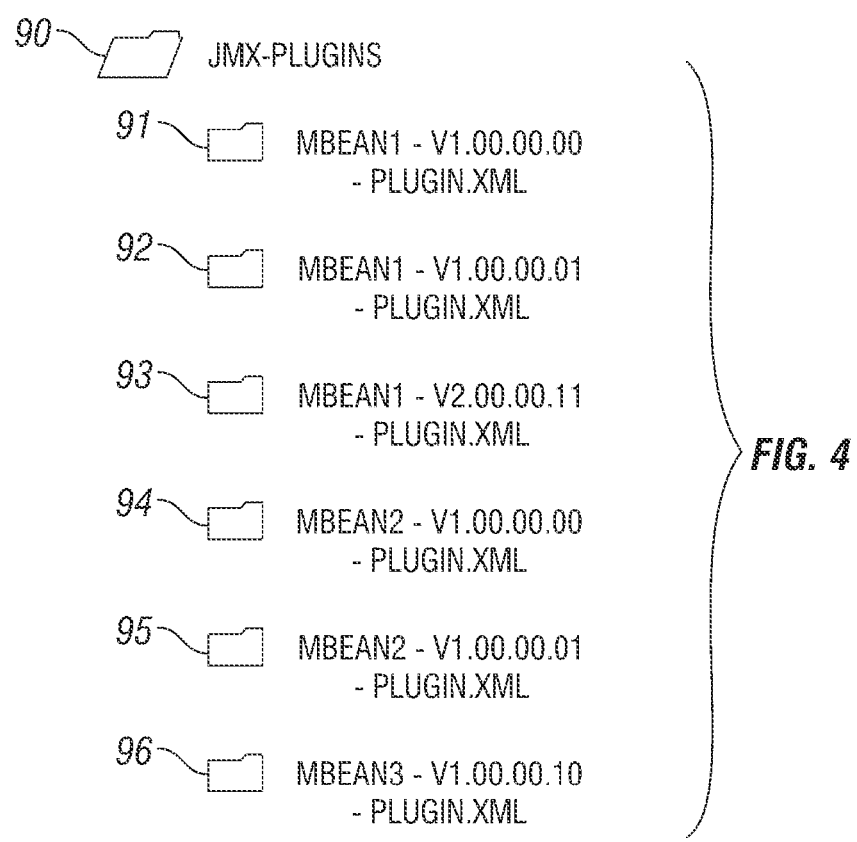
FIG. 4 is a schematic diagram of a JMX plugin directory having multiple versions of some MBeans.

FIG. 4 is a schematic diagram of a JMX plugin directory 90 having multiple versions of some MBeans. The MBean named MBean1 has three versions in directory 90, where each version of MBean 1 is in a different subdirectory 91, 92, 93. As shown, MBean1 version 2.00.00.11 in subdirectoy 93 has the highest version number of all the MBeans of the same name. Accordingly, the JMX plugin agent would register this version of MBean1 with the MBean server. In a similar manner, the directory 90 includes two version of MBean2 in separate subdirectories 94, 95, such that MBean2 version V1.00.00.01 would be registered. Subdirectory 96 contains the only version of MBean3 in directory 90, such that MBean3 version v1.00.00.10 would be registered. In accordance with the invention, if the subdirectory 93 containing the highest version of MBean1 were deleted or otherwise removed from directory 90, then MBean1 version v1.00.00.01 would then become the highest version of MBean1 and MBean1 v1.00.00.01 in subdirectory 92 would be registered in place of MBean1 v2.00.00.11 of subdirectory 93.

Alternatively, the version information for a given named MBean may be contained in the plugin.xml file or other file associated with the MBean. It is not necessary that the version information be provided in a subdirectory name as shown in FIG. 4. It is sufficient that the JMX plugin agent can find and read the version of the MBean.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer implemented method, comprising:
   identifying a JAVA managed bean (MBean) in a JAVA management extensions (JMX) plugin directory having a plurality of versions of the MBean; and
   registering the latest version of the MBean with an MBean server without removing any previous version of the MBean from the plugin directory.

2. The method of claim 1, further comprising:
   creating an instance of the registered version of the MBean.

3. The method of claim 1, further comprising:
   continuously scanning the JMX plugin directory for new versions of the MBean.

4. The method of claim 1, further comprising:
   identifying a new version of the MBean;
   unregistering the current version of the MBean from a plugin registry; and
   registering the new version of the MBean with the plugin registry without removing the current version of the MBean from the plugin directory.

5. The method of claim 1, wherein the MBean version is incorporated into the name of a subdirectory containing a plugin.xml file for the MBean version.

6. The method of claim 1, further comprising:
   instantiating the MBean for each of a plurality of instances of an MBean server, wherein each instantiated MBean is created from the same JMX plugin directory.

7. The method of claim 6, wherein the plurality of MBean server instances are each associated with an instance of an application server program on a common web server.

8. The method of claim 1, further comprising:
   identifying MBeans that the MBean depends upon; and
   determining whether the dependent MBeans are present in the JMX plugin directory.

9. A non-transitory machine-accessible medium containing instructions, which when executed by a machine, cause the machine to perform operations, comprising:
   instructions for identifying a JAVA managed bean (MBean) in a JAVA management extensions (JMX) plugin directory having a plurality of versions of the MBean; and
   instructions for registering the latest version of the MBean with an MBean server without removing any previous version of the MBean from the plugin directory.

10. The machine-accessible medium of claim 9, further comprising:
  instructions for creating an instance of the registered version of the MBean.

11. The machine-accessible medium of claim 9, further comprising:
  instructions for continuously scanning the JMX plugin directory for new versions of the MBean.

12. The machine-accessible medium of claim 9, further comprising:
  instructions for identifying a new version of the MBean;
  instructions for unregistering the current version of the MBean from a plugin registry; and
  instructions for registering the new version of the MBean with the plugin registry without removing the current version of the MBean from the plugin directory.

13. The machine-accessible medium of claim 9, further comprising:
  instructions for instantiating the MBean for each of a plurality of instances of an MBean server, wherein each instantiated MBean is created from the same JMX plugin directory.

14. The machine-accessible medium of claim 9, further comprising:
  instructions for identifying MBeans that the MBean depends upon; and
  instructions for determining whether the dependent MBeans are present in the JMX plugin directory.

* * * * *